Figure 1:
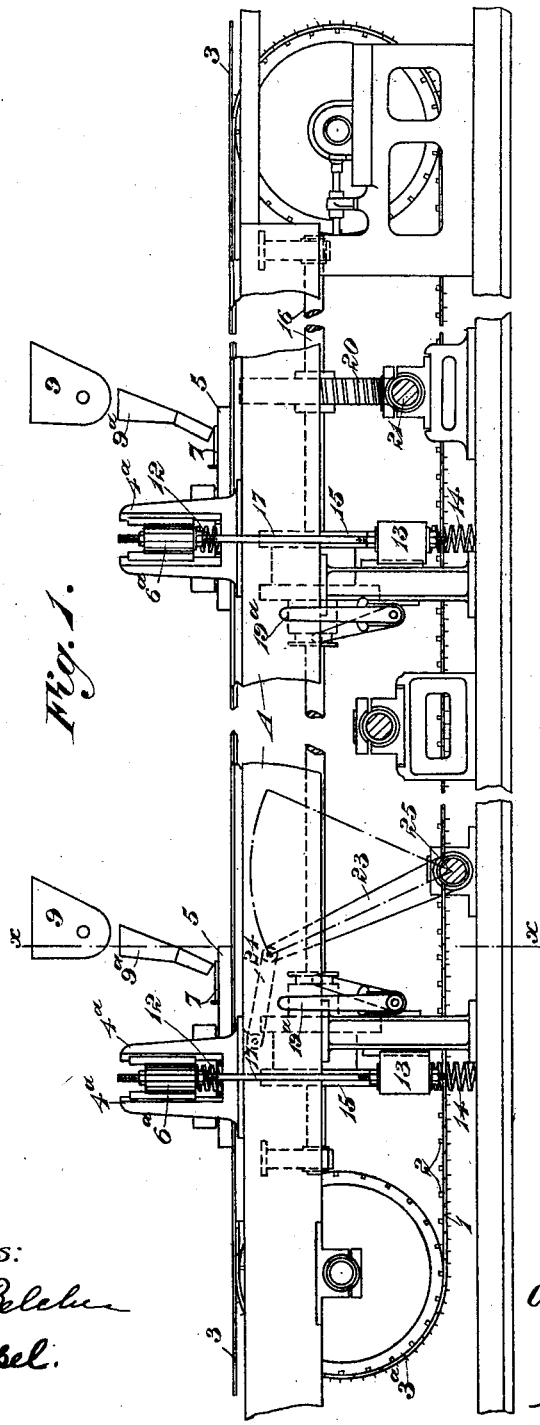

No. 697,552. Patented Apr. 15, 1902.
C. H. SCOTT.
MANUFACTURE OF LINOLEUM.
(Application filed July 26, 1898.)
(No Model.) 5 Sheets—Sheet 1.

Witnesses:

Inventor
Charles Herbert Scott
By
Attorney

No. 697,552. Patented Apr. 15, 1902.
C. H. SCOTT.
MANUFACTURE OF LINOLEUM.
(Application filed July 26, 1898.)
(No Model.) 5 Sheets—Sheet 3.

Witnesses:
C. L. Belcher
W. H. Capel

Inventor
Charles Herbert Scott
By
H. C. Townsend
Attorney

No. 697,552. Patented Apr. 15, 1902.
C. H. SCOTT.
MANUFACTURE OF LINOLEUM.
(Application filed July 26, 1898.)
(No Model.) 5 Sheets—Sheet 4.

Witnesses:
C. L. Belcher
Wm H. Capel

Inventor
Charles Herbert Scott
By
H. C. Townsend
Attorney

No. 697,552. Patented Apr. 15, 1902.
C. H. SCOTT.
MANUFACTURE OF LINOLEUM.
(Application filed July 26, 1898.)
(No Model.) 5 Sheets—Sheet 5.
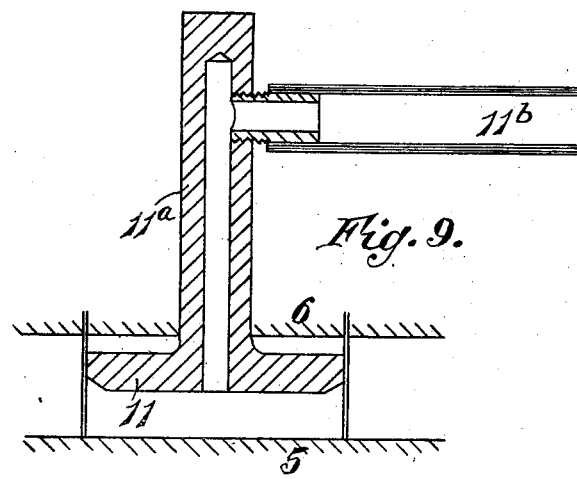
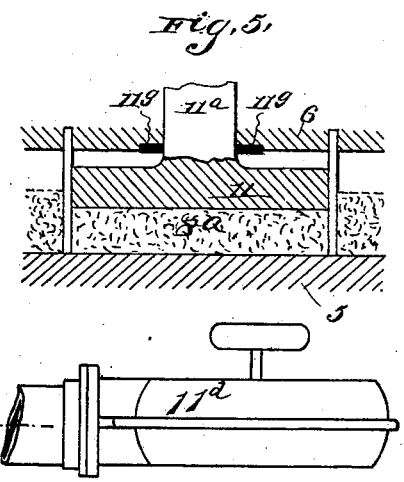
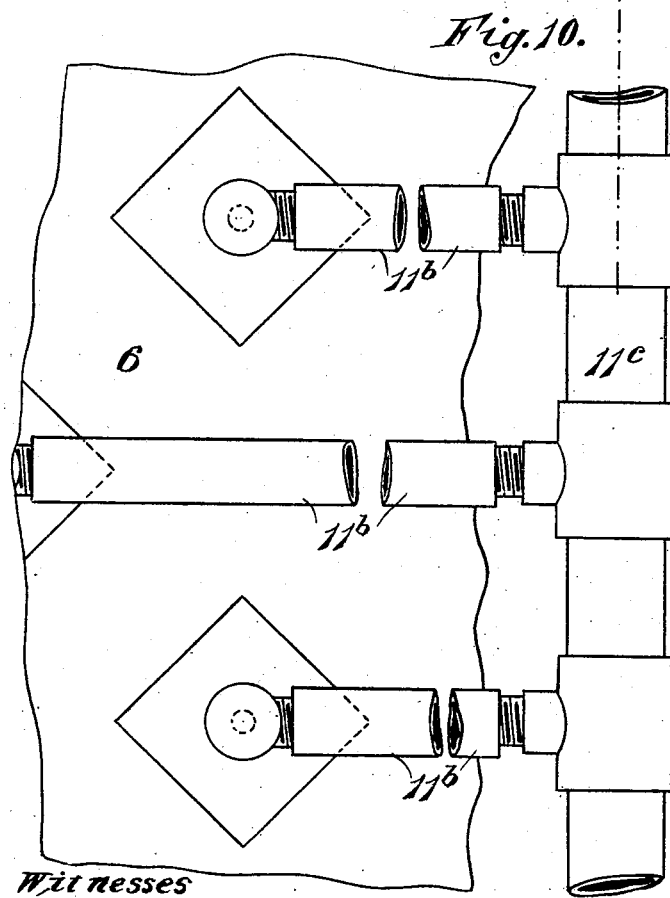
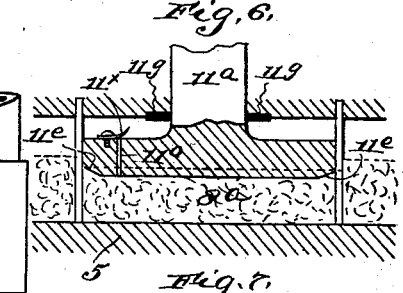
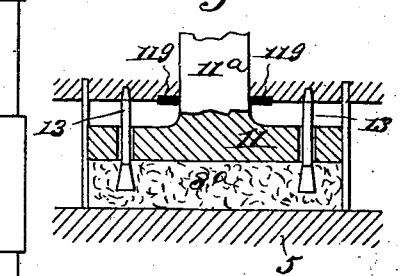
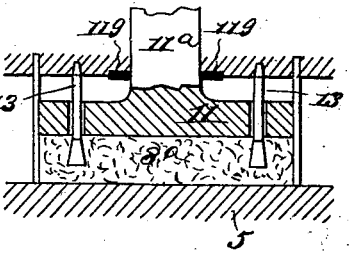
Witnesses
C. L. Belcher
Wm H. Caspel
Inventor
Charles H. Scott
By
Attorney
THE NORRIS PETERS CO., PHOTO-LITHO., WASHINGTON, D. C.

UNITED STATES PATENT OFFICE.

CHARLES HERBERT SCOTT, OF GLOUCESTER, ENGLAND.

MANUFACTURE OF LINOLEUM.

SPECIFICATION forming part of Letters Patent No. 697,552, dated April 15, 1902.

Application filed July 26, 1898. Serial No. 686,912. (No model.)

*To all whom it may concern:*

Be it known that I, CHARLES HERBERT SCOTT, a subject of the Queen of Great Britain and Ireland, residing at Gloucester, in the county of Gloucester, England, have invented Improvements in the Manufacture of Linoleum, (for which I have obtained a patent in Great Britain, No. 980, dated January 13, 1898,) of which the following is a specification.

This invention relates to improvements in the manufacture of inlaid linoleum—that is to say, linoleum in which the pattern passes completely or partially through the body of the linoleum—and in machinery or apparatus therefor.

According thereto linoleum of the proper colors and kinds for use in producing the desired pattern is fed onto plates or supports and subjected to the action of movable dies by which pieces of linoleum of suitable shape are separated out and in a more or less compressed state lifted from the plate and deposited upon a backing, which may be of ordinary kind, such as canvas, which is moved forward in an intermittent or step-by-step manner and may be covered or not with a preliminary coating of linoleum or other suitable material. The linoleum mixture is preferably fed onto the plates in a loose granular condition from tiering-boxes, by which any desired depth of material may be obtained; but it may be fed onto the plates in the form of more or less compressed sheets of linoleum mixture, and the compressed portions of linoleum separated out by the dies are held in the latter by suction or the external air-pressure while being transferred from the plates to the backing.

As will be obvious, machinery or apparatus for carrying out my invention, which is specially suitable for the production of linoleum with geometrical patterns, can be constructed in various forms.

Figure 2:
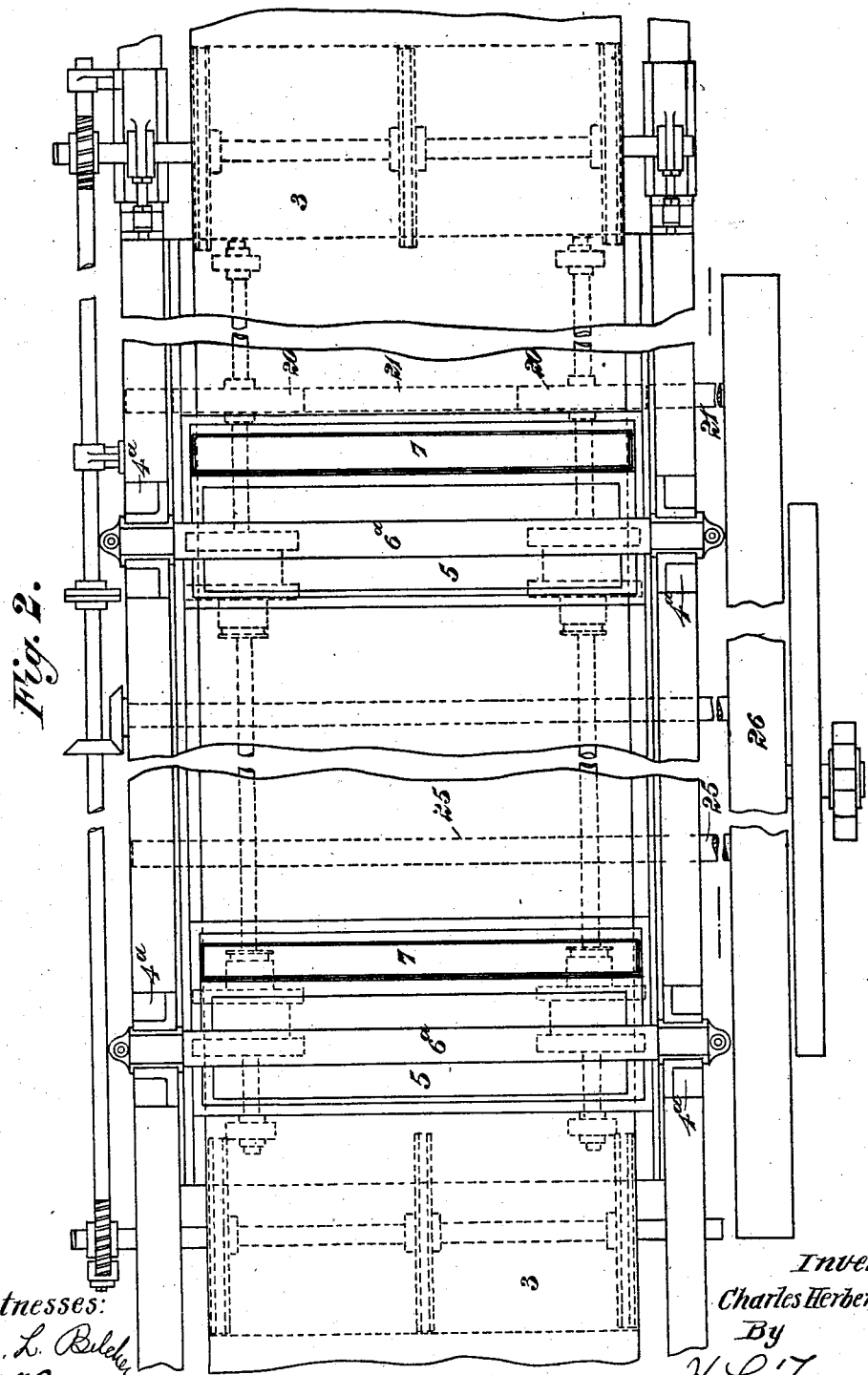
Figure 3:
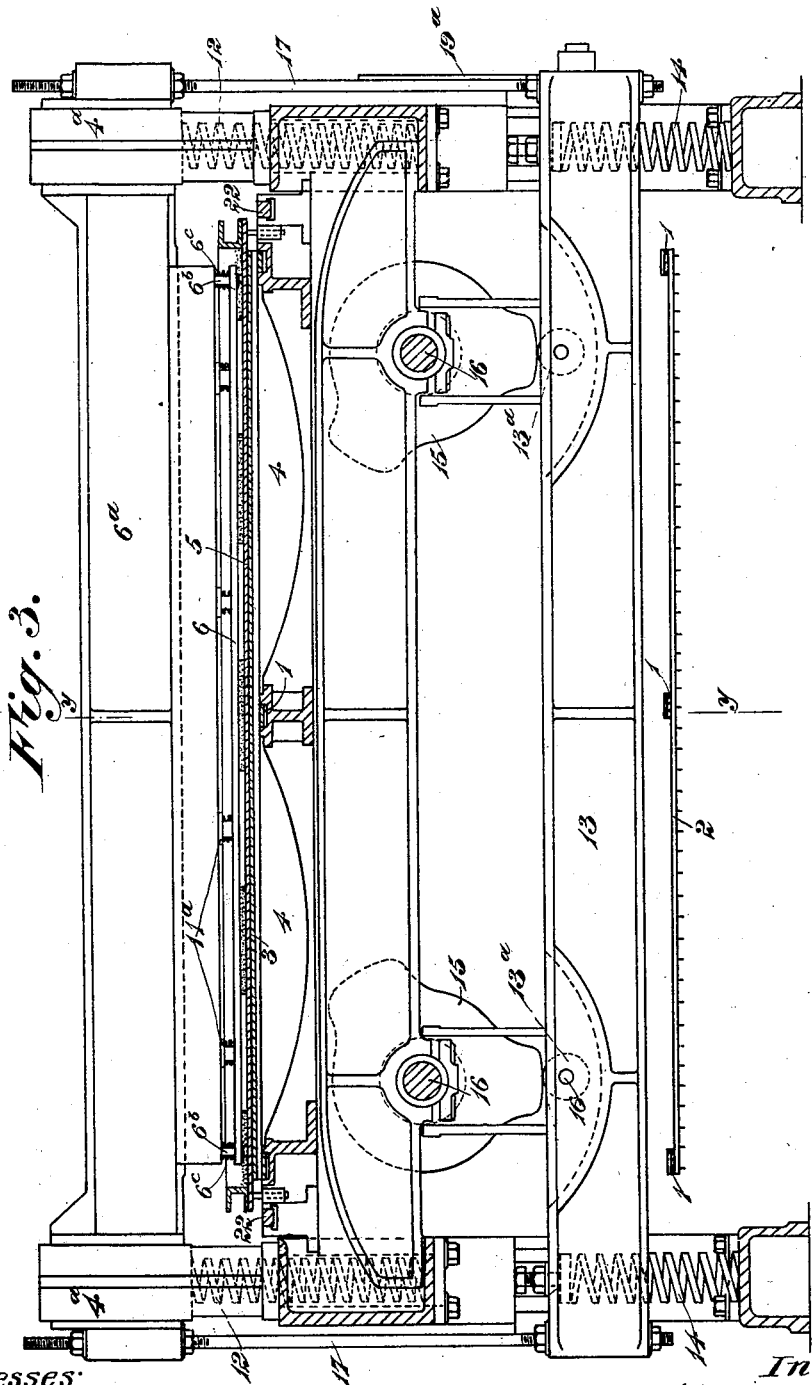
Figure 4:
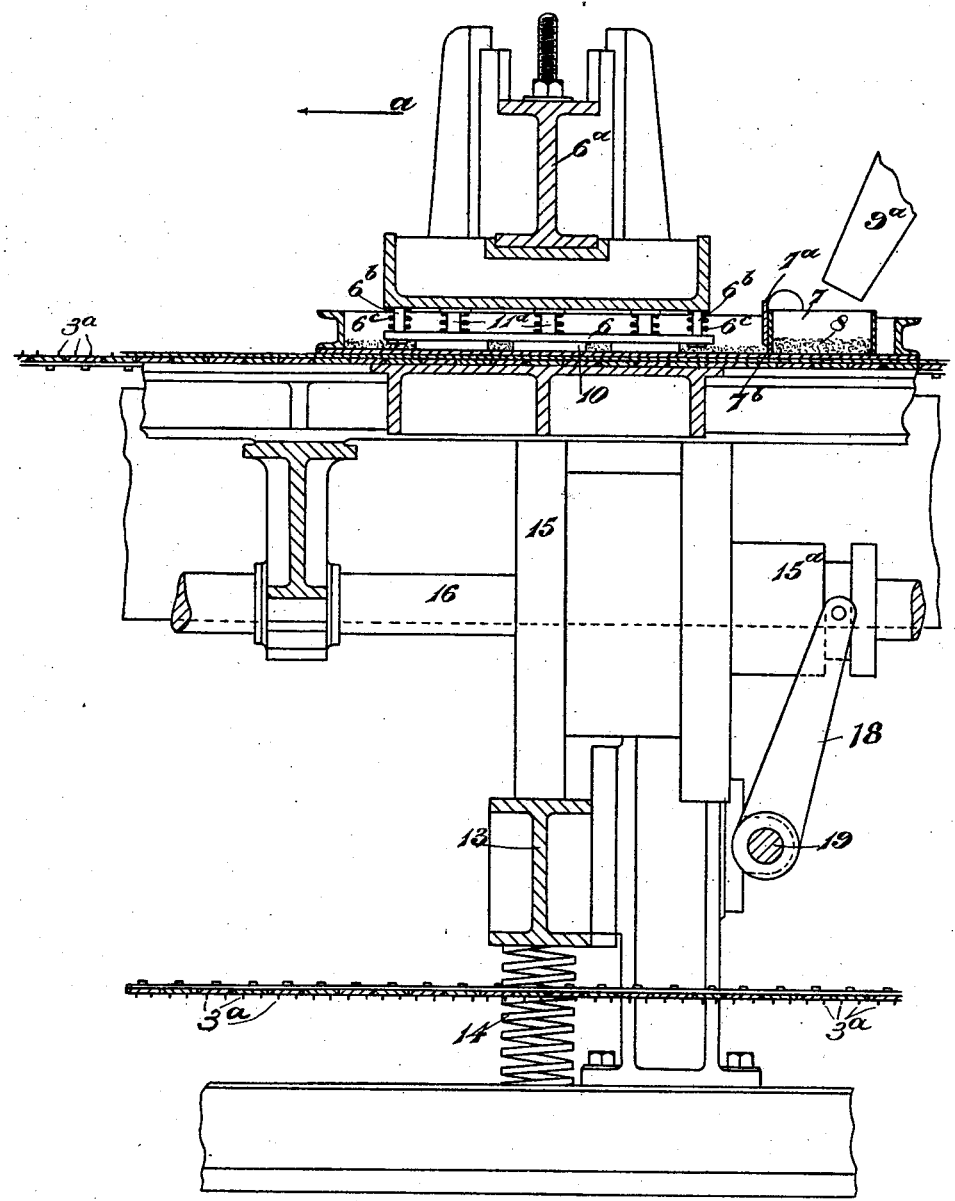

Figures 1, 2, and 3 show in side elevation, plan, and cross-section, respectively, the latter on the line $xx$ of Fig. 1, part of one construction of machine for carrying out my invention. Fig. 4 is a part longitudinal section on the line $yy$ of Fig. 3, showing, *inter alia*, one of the tiering-plates and boxes with pressure block and dies. Fig. 5 is a part vertical section showing, to a larger scale than Figs. 1 to 4, inclusive, part of a pressure-block with die. Figs. 6 and 7 are similar views to Fig. 5, showing modified constructions. Fig. 8 shows in longitudinal vertical section a portion of backing with pieces of compressed linoleum thereon. Fig. 9 is a part vertical section, and Fig. 10 a part plan showing a further modified construction.

According to the arrangement shown, the machine comprises an endless conveyer consisting of endless bands 1, (or chains,) carrying closely-arranged transverse strips 2, adapted to engage with and carry the backing 3 over a stationary table 4 in an intermittent or step-by-step manner—as, for example, in the way and by the means described in the specification of Letters Patent No. 646,878, dated April 3, 1900, and granted to me. Above the table 4 are arranged two or more supports 5, shown in the form of plates, each of which is mounted to slide to and fro longitudinally below a vertically-movable pressure-block 6 and also below a stationary tiering-box 7, which is arranged at one side of the pressure-block. Granulated linoleum mixture 8, of ordinary kind and suitable color, is fed at intervals—as, for example, by a feeding device 9 and chute $9^a$—into each tiering-box 7, which is provided with a vertically-adjustable rear side $7^a$, by which the rate of flow of linoleum mixture onto the plate 5 through a slit $7^b$, and consequently the thickness of the layer of linoleum mixture deposited upon the said plate when the same moves in one direction under the box, can be varied to suit requirement. Each pressure-block 6 is provided with strips 10 of metal or other material arranged to form hollow dies of the desired shape in plan, and within each of which is a piston or plunger 11, that fits or is adapted by packing material, such as felt, to fit the die 10 fairly tightly and is capable of being raised and lowered at will independently of the pressure-block and die. Through the piston 11 and also it may be through the pressure-block 6 is a hole $11^o$, Fig. 6, provided with a light lift-valve $11^x$, so that air can escape upward through the hole, but cannot descend.

The arrangement of the several parts is such that as each distributing-plate 5 is moved in one direction—say in the direction of the arrow $a$, Fig. 4—under its corresponding tiering-box 7 a suitably thick layer of loose linoleum mixture 8 will be deposited upon it. When the said plate arrives at the end of its stroke in the direction of the arrow, the pressure-block 6 is caused to descend, so as to cause the dies 10 carried thereby to cut through the layer of linoleum mixture 8, the portions $8^a$ of which within the dies are immediately afterward suitably compressed by the descent of the pistons 11, (see Figs. 5, 6, and 7,) air within the dies 10 and between the linoleum $8^a$ and pistons 11 escaping through the holes $11^c$ in the latter into the spaces between the pistons and pressure-block. The pistons 11 are then caused to ascend quickly within the dies, whereupon the whole block 6 is lifted, the partial vacuum created in the spaces between the pistons and the compressed pieces of linoleum by the ascent of the pistons within the dies serving to cause the pressure of the external atmosphere to hold up the pieces of linoleum. To aid in maintaining the partial vacuum within the said spaces, the block 6 may be provided around the piston-rod $11^a$ with a ring of packing material $11^g$, such as india-rubber, against which the corresponding piston is seated when raised. After the block is raised the distributing-plate 5 is then slid back out of the way of the pressure-block 6, the linoleum mixture 8 remaining on the plate being forced back into the tiering-box 7 through the slit $7^b$ in readiness to be again tiered onto the plate during the next forward movement of the plate. The pressure-block is then caused to descend near to the now stationary backing 3 below, and the pistons are caused to move downward relatively to the dies 10 and push out the compressed pieces $8^a$ of linoleum and force them onto the backing, which after the block has been raised therefrom is then moved forward into position to receive further pieces of linoleum in the manner above described.

If the separate pieces $8^a$ of linoleum are so large or irregularly shaped that they are liable to fall out of the dies 10 while the block 6 is being raised, the said block 6 may be provided with means, such as pins 13, (see Fig. 7,) that are slightly larger at the bottom than at the top and which serve to hold up the pieces $8^a$ of linoleum compressed around them until pushed off by the piston 11, or the dies 10 may be made a little smaller at the bottom than at the top. Where necessary, means may be provided for exhausting the air from between the pistons 11 and pieces $8^a$ of linoleum. For this purpose each piston-rod 11 and its rod $11^a$ may be made hollow, as shown in Figs. 9 and 10, and be connected by a flexible tube $11^b$ to an exhaust-pipe $11^e$, that is common to all the pistons and is connected to an exhausting device $11^d$, such as fan, jet, or pump.

To insure close joints between the several pieces $8^a$ of linoleum composing a pattern without having to finally compress such pieces of linoleum to such an extent as to distort the pattern, as heretofore usual, the pistons 11 are rounded or beveled off at the edges, as shown at $11^e$ in Fig. 6, so that the compressed pieces $8^a$ of linoleum produced by them and the dies 10 are formed on their upper side with peripheral beads or raised edges $8^b$, (see Fig. 8,) which when the several pieces of linoleum are subjected to a final pressing operation between rolls or otherwise, as usual, are pressed down level with and effectually close the joints between the various pieces of linoleum.

The pressure-blocks 6, hereinbefore described, are preferably pitched at a distance apart equal to three or more times the width of the pattern or part thereof to be produced by each group. In the arrangement shown the pressure-block 6 is connected to a support $6^a$, Figs. 3 and 4, that runs transversely of the machine, and is hereinafter called a "cross-piece," by studs $6^b$, that are fixed to the block and have a limited motion through the cross-piece, and between the block and cross-piece are arranged springs $6^c$, that tend to force the block downward and away from the cross-piece. The piston-rods $11^a$ may be connected to the said cross-piece, or they may, as in the example shown in Fig. 4, simply bear against the cross-piece, the springs $6^c$ surrounding them and bearing at one end against collars thereon and at the other end against the block. By this arrangement when the cross-piece $6^a$ moves downward it and the block 6 will move as one piece until the dies 10 have cut through the layer of linoleum 8 on the plate 5, whereupon the block 6 will stop, while the cross-piece will move downward a farther short distance against the action of the springs $6^c$, and so cause the pistons 11 to compress the linoleum within the dies to the required extent. On the cross-piece commencing to move upward the block 6 will at first be held down by the springs, which will at the same time raise the pistons 11 and hold the pieces of linoleum within the dies until the cross-piece reaches the limit of the studs $6^b$, whereupon the whole will rise as one piece. The plate 5 will be moved from below the block. On the next downstroke of the combined cross-piece and block the latter will be brought to rest upon stationary parts of the machine, with the lower edges of the dies upon or near to the backing, while the cross-piece will move downward a farther distance, sufficient to force the stamped-out pieces $8^a$ of linoleum from the dies onto the backing.

Each combined block 6 and cross-piece $6^a$ can be raised and lowered by any convenient means. In the example shown the ends of the cross-piece $6^a$ are arranged to work vertically in guideways in standards $4^a$ and are carried by springs 12, which tend to move the cross-piece and attached parts into and hold them in their raised position. Each cross-piece, with attached parts, is moved downward against the action of its springs 12 by a transverse beam 13, which is arranged below the stationary table 4 and is moved downward against the action of springs 14 by cams 15, which are arranged to be rotated by two longitudinal shafts 16 and to act against antifriction-rollers 13ᵃ on the beam 13. The connection between the cross-pieces 6ᵃ and the means for depressing them may be such that any one of the blocks 6 can be put out of action while the machine continues in motion. For this purpose each cross-piece 6ᵃ may be connected to the corresponding beam 13 below it by a pair of rods 17, so that the block and beam rise and fall together, and the cams 15 are feathered to the shafts 16, so that they will rotate therewith, but are capable of being moved endwise thereon by forked levers 18, which engage grooved bosses 15ᵃ on the cams and are fixed on a rock-shaft 19, provided with a hand-lever 19ᵃ, the arrangement being such that by operating the hand-lever in one direction or the other the pair of cams can be brought over or moved from above the beam 13, according as it is desired to put the corresponding block in or out of operation. The cams 15 are each formed with two operative parts, as shown in Fig. 3, so that they will act to depress the pressure-block and dies twice for each rotation of the shafts 16, as and for the purposes hereinbefore explained. The said shafts may be driven through worm-gearing 20 from a transverse driving-shaft 21.

In the example shown the plates 5 are moved backward and forward below their respective blocks 6 by longitudinal tiering-bars 22, to which they are attached and which are caused to move to and fro on the framing A of the machine by a pair of lever-arms 23, that are connected to the said bars by links 24 and are fixed to a rock-shaft 25, which extends from one side of the machine and is rocked at the required times by suitable means, such as cams located within a casing 26. The tiering-bars may be connected to any suitable arrangement of energy-accumulator that will serve to cushion them and their attached parts at each end of their strokes and by then giving out energy facilitate their movement in the reverse direction.

What I claim is—

1. In the manufacture of linoleum, the combination with a support for linoleum, vertically-movable hollow dies for cutting out pieces of linoleum from a layer thereof on said support, and means for moving said support relatively to said dies, of an air-exhausting device connected to each die for the purpose of holding the piece of linoleum therein until the die is in position to apply it to the linoleum backing, and a piston in each die for then forcing its respective piece of linoleum out onto said backing, substantially as set forth.

2. In an apparatus for manufacturing linoleum, the combination with a support for loose granulated linoleum, one or more vertically-movable hollow dies for cutting portions of loose granulated linoleum from a layer thereof on said support, and means for moving said support and die or dies relatively to each other, of a piston within each die for compressing the portion of linoleum therein and constructed to pneumatically hold it therein until the die is in position to apply it to the linoleum backing, and means for forcing down each piston to deposit said portion upon the said backing, substantially as set forth.

3. In a machine for making inlaid linoleum, the combination with a support for linoleum, vertically-movable dies adapted to cut out pieces of linoleum from a layer thereof on said support, and means for moving said support and dies relatively to each other, of pistons fitting said dies and movable endwise therein, said pistons being provided with air-exit openings so that a partial vacuum can be set up in the space between each piston and a piece of linoleum within the corresponding die, substantially as described for the purpose specified.

4. In a machine for making inlaid linoleum, the combination of dies adapted to cut out pieces of linoleum from a layer thereof, and pistons fitting said dies and movable endwise therein, said pistons being provided with air-exit openings controlled by non-return valves, substantially as described for the purpose specified.

5. In a machine for making inlaid linoleum, the combination of a table, a pressure-block arranged above said table and provided on its under side with dies, means for raising and lowering said block, pistons fitting said dies air-tight and each formed with an air-exit opening through which air can pass from the under side of said piston, means for preventing the return of said air, means for raising and lowering said pistons relatively to said dies, a plate serving to carry a layer of linoleum, means for moving said plate under said pressure-block and for withdrawing it therefrom, and means for feeding a backing below said pressure-block and plate.

6. In a machine for making inlaid linoleum, the combination of a table, a pressure-block arranged above said table and provided on its under side with dies, means for raising and lowering said block, pistons fitting said dies air-tight and movable endwise therein, each piston being formed with an air-exit opening through which air can pass from the under side of said piston, a plate adapted to be moved under said pressure-block and to be withdrawn and serving to carry a layer of linoleum, means for feeding linoleum over said plate, and means for feeding a backing below said plate.

7. A machine for making inlaid linoleum comprising a table, two or more independent pressure-blocks provided on their under sides with dies, means for separately raising and lowering each of said blocks with dies, a piston arranged within each of said dies and formed with an air-exit passage through which air can pass from the under side of said pistons, means for preventing the return of said air to the under side of said pistons, and means for raising and lowering said pistons relatively to said dies, plates arranged horizontally above said table, means for moving each of said plates below its corresponding pressure-block and afterward withdrawing it, and means for feeding linoleum over each of said plates.

8. In a machine for making inlaid linoleum, the combination with a vertically-movable pressure-block provided on its under side with hollow dies, of pistons fitted to slide air-tight within said dies, and having rounded or beveled lower edges, substantially as described for the purpose specified.

9. In a machine for making inlaid linoleum, the combination with a vertically-movable pressure-block provided on its under side with hollow dies, of pistons arranged to slide air-tight within said dies and formed with air-exit passages through which air can pass from the under sides of said pistons, means for preventing the return of said air, and means external to said dies for moving the pistons endwise therein alternately in opposite directions, substantially as herein described for the purpose specified.

10. In a machine for making inlaid linoleum, the combination of a pressure-block provided on its under side with hollow dies, a vertically-movable cross-piece to which said pressure-block is connected so as to be capable of rising and falling relatively thereto, springs tending to force said pressure-block and cross-piece apart, pistons fitting said dies and having their rods extending through said block and adapted to be depressed by said cross-piece said pistons being formed with air-exit passages through which air can pass from the under side of said pistons, means for preventing the return of said air, means for raising and lowering said cross-piece, a plate adapted to support a layer of linoleum below said pressure-block, means for moving said plate below said pressure-block, means withdrawing it, and means for feeding a backing below said pressure-block.

11. In a machine for making inlaid linoleum, the combination of a pressure-block provided on its under side with hollow dies, a vertically-movable cross-piece to which said pressure-block is connected so as to be capable of rising and falling relatively thereto, springs tending to force said pressure-block and cross-piece apart, pistons fitting said dies and having their rods extending through said blocks and adapted to be depressed by said cross-piece, said pistons being formed with air-exit passages through which air can pass from the under side of said pistons, means for preventing the return of said air, means for raising and lowering said cross-piece, a plate adapted to support a layer of linoleum below said pressure-block, means for moving said plate below said pressure-block and withdrawing it, means for automatically feeding a layer of linoleum over said plate, and means for feeding a backing below said plate.

12. A machine for making inlaid linoleum comprising a table, two or more combined pressure-blocks and cross-pieces arranged independently of each other above said table, each of said pressure-blocks being provided on its under side with hollow dies, with pistons fitting said dies and having their rods bear against the corresponding cross-piece, and springs tending to force said block away from the corresponding cross-piece and permitting the latter to move toward and away from said block when downward movement thereof is arrested, said piston being formed with air-exit passages through which air can pass from the under side of said pistons, means for preventing the return of said air, mechanism for raising and lowering each of said cross-pieces independently of each other, horizontal plates arranged above said table, means for reciprocating said plates below said pressure-blocks, and stationary tiering-boxes each adapted to deposit a layer of granulated linoleum over its corresponding plate when the same is moved under it in one direction, substantially as described.

Signed at Gloucester this 15th day of July, 1898.

CHARLES HERBERT SCOTT.

Witnesses:
JOHN WATKINS HULBERT,
JOHN EDWARD WESTLE.